(12) United States Patent
Mangold et al.

(10) Patent No.: US 9,380,321 B2
(45) Date of Patent: Jun. 28, 2016

(54) METHOD AND APPARATUS FOR LOW-LATENCY CAMERA CONTROL IN A WIRELESS BROADCASTING SYSTEM

(75) Inventors: Stefan Mangold, Liebefeld (CH); Vladimir Vukadinovic, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 1139 days.

(21) Appl. No.: 13/352,863

(22) Filed: Jan. 18, 2012

(65) Prior Publication Data

US 2013/0182104 A1    Jul. 18, 2013

(51) Int. Cl.
| | | |
|---|---|---|
| H04N 7/18 | (2006.01) | |
| H04N 21/218 | (2011.01) | |
| H04N 5/222 | (2006.01) | |
| H04N 5/232 | (2006.01) | |
| H04N 21/2187 | (2011.01) | |
| H04N 21/234 | (2011.01) | |
| H04N 21/84 | (2011.01) | |
| H04N 21/854 | (2011.01) | |

(52) U.S. Cl.
CPC ....... *H04N 21/21805* (2013.01); *H04N 5/2226* (2013.01); *H04N 5/23206* (2013.01); *H04N 7/181* (2013.01); *H04N 21/2187* (2013.01); *H04N 21/23418* (2013.01); *H04N 21/84* (2013.01); *H04N 21/854* (2013.01)

(58) Field of Classification Search
CPC .............. H04N 21/21805; H04N 21/2187; H04N 21/23418; H04N 21/84; H04N 21/854; H04N 7/181; H04N 5/2226; H04N 5/23206
See application file for complete search history.

(56) References Cited

U.S. PATENT DOCUMENTS

| | | | | |
|---|---|---|---|---|
| 2006/0139460 | A1* | 6/2006 | Ozaki | 348/222.1 |
| 2009/0082110 | A1* | 3/2009 | Relyea et al. | 463/42 |
| 2009/0115854 | A1* | 5/2009 | Hio | 348/207.1 |
| 2011/0004898 | A1* | 1/2011 | Ritter et al. | 725/32 |

OTHER PUBLICATIONS

Wayne Wolf et al., "Smart Cameras as Embedded Systems", Sep. 2002, Computer, 2002 EEE, (pp. 48-53, 6 pages total).
Sven Fleck et al., "A Smart Camera Approach to Real-Time Tracking", [no date], 4pgs.
Michael Bramberger et al., "Distributed Embedded Smart Cameras for Surveillance Applications", Computer, IEEE Computer Society, Feb. 2006, (pp. 68-75, 8 pages total).
M. Quaritsch et al., "Decentralized Object Tracking in a Network of Embedded Smart Cameras", [no date], 4pgs.

(Continued)

*Primary Examiner* — Tat Chio
(74) *Attorney, Agent, or Firm* — McCormick, Paulding & Huber LLP

(57) ABSTRACT

Systems, methods, apparatus, methods and computer program code are disclosed for operating automated video broadcasting systems and include capturing, by a video camera, video data at an event site. Scene description data is extracted from the video data, and the scene description data is transmitted, over a wireless communication network, to a video processing system. The video data is transmitted separately from the scene description data from the video camera to the video processing system over the wireless communication network.

20 Claims, 4 Drawing Sheets

(56) References Cited

OTHER PUBLICATIONS

Youlu Wang et al., "Cooperative Object Tracking and Composite Event Detection With Wireless Embedded Smart Cameras", IEEE Transactions on Image Processing, vol. 19, No. 10, Oct. 2010, (pp. 2614-2633).

Sanjay Singh et al., "Real-time Object Segmentation in Smart Camera for Remote Surveillance Scenario", 2010 International Conference on Advances in Computer Engineering, IEEE Computer Society, (pp. 360-362, 3 pages total).

\* cited by examiner

METHOD AND APPARATUS FOR LOW-LATENCY CAMERA CONTROL IN A WIRELESS BROADCASTING SYSTEM

FIELD

The present invention relates to methods and apparatus for operating a wireless camera system. More particularly, some embodiments relate to methods and apparatus for wireless protocol optimization in a wireless video broadcasting system.

BACKGROUND

Multiple video cameras are often used in conjunction with the production of television and other broadcast programs. In many situations, such as the production of sporting, news or other broadcast programs, it is not economically viable to send large camera crews to cover events. One possible solution is to set up automated camera systems at the event's site to minimize labor and deployment costs. Automated camera systems typically capture video data, and process these data in real-time for use in identifying and tracking objects and actions on the field (e.g., such as tracking a player on the football field, etc.). Scene description data ("SDD") are characteristic data used in such systems to allow the identification and tracking of such objects and actions. Some video cameras extract this SDD from the video being captured, and transmit the SDD along with the video stream to a central video processing unit (e.g., located at a local or remote broadcast production facility). The video processing unit analyzes the SDD from one or more video cameras, and transmits camera control data ("CCD") back to each video camera to control the operation and orientation of each camera.

The use of such automated camera systems can provide a number of cost savings and efficiencies in broadcast program production. Unfortunately, however, many events that are broadcast are in locations (such as arenas, fields, etc.) that do not allow for cost-effective wired connections between one or more automated video cameras and a central video processing unit. For example, if a high school soccer match is to be broadcast, it is simply not cost effective to connect the camera systems to a video processing unit using cables (such as Ethernet cables). Such cabling often requires that conduit be run between the devices, and frequently, to be effective, the cabling and conduit needs to be buried so it is not damaged or does not interfere with the activities in the field. Therefore, it is desirable to connect one or more video cameras with one or more video processing units via a wireless connection. Because automated cameras require the ability to send both video data and SDD (and to concurrently receive the CCD), each of these data streams may compete with each other for wireless resources (such as radio channel(s), timeslots, etc.). Further complicating the allocation of wireless resources is the fact that video data, particularly high definition video data, requires substantial capacity for transmission.

It would be desirable to provide methods and apparatus to manage and optimize the use of such wireless resources, allowing the best possible video broadcast performance in situations where one or more video cameras are in wireless communication with one or more video processing units.

DETAILED DESCRIPTION

Figure 1:
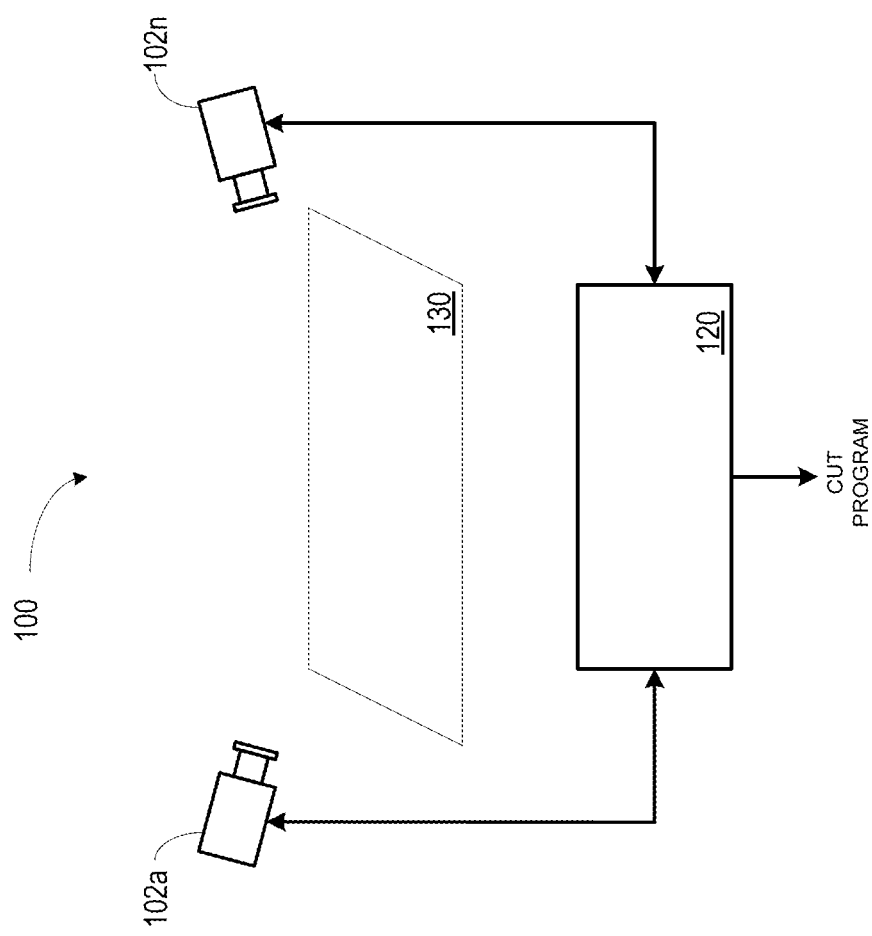
FIG. 1 is a block diagram of portions of a broadcast event production configuration.

Systems, methods, apparatus, means, and computer program code are disclosed for operating automated video broadcasting systems and include capturing, by a video camera, video data at an event site. Scene description data is extracted from the video data, and the scene description data is transmitted, over a wireless communication network, to a video processing system. The scene description data is transmitted in a plurality of data packets prioritized to have a reduced transmission delay over the wireless communication network. The video data is separately transmitted from the video camera to the video processing system over the wireless communication network.

Pursuant to some embodiments, broadcast systems operated pursuant to the present invention achieve lower latency and higher transmission reliability when using wireless communication networks by use of wireless protocol optimization. Pursuant to some embodiments, the wireless protocol optimization is configured to allocate available wireless communication resources to different data streams (including data streams carrying scene description data, video data, and camera control data). The optimization, in some embodiments, is based on the information contained in the scene description data and the camera control data.

With these and other advantages and features that will become apparent, embodiments may be more clearly understood by reference to the following detailed description, the appended claims, and the drawings attached hereto.

Applicants have recognized that there is a need for methods, systems, apparatus, means and computer program products to optimize video broadcast performance in environments using one or more wireless video cameras.

Pursuant to some embodiments, the present invention provides apparatus and methods that achieve lower latency and higher transmission reliability in a wireless video broadcasting system by means of wireless protocol optimization. Pursuant to some embodiments, the wireless protocol optimization is configured to allocate available radio resources to different data streams (including data streams carrying SDD, CCD, and video data). The optimization is based on the information contained in the SDD and CCD. Applicants have discovered that apparatus and methods pursuant to the present invention provide desirable improvements in latency and reliability as compared to implementations where all the data streams from each of the video cameras at a broadcast event are transmitted with equal priorities, and where the wireless communication protocols are configured solely based on current radio channel conditions and data traffic loads irrespective of the information contained in the SDD and CCD. The result is improved performance, operation and control of wireless video cameras in the production of broadcast events.

A number of concepts and terms are used herein to describe features of some embodiments. For example, those skilled in the art, upon reading this disclosure, will appreciate that some video streams and signals transmitted wirelessly pursuant to the present invention may be "compressed" or generated using a variety of different "compression" techniques, where "compression", as used herein, refers to the transformation of a signal into another form for transmission that consumes less capacity than transmitting the un-transformed signal would consume. For example, the term "compression", as used herein, includes "converting", "encoding" and other transformations of a signal to another signal that consumes less capacity than the original signal when stored or transmitted.

In general, as used herein, the term "wireless network" refers to wireless communication networks including those defined by IEEE Standard 802.11, as well as licensed radio systems such as IEEE Standard 802.16, or the like.

In general, as used herein, the term "uplink" (when referring to communication between a video camera and a video processing center or video processing computer system), refers to transmissions that originate from the video camera and end at the video processing center, and the term "downlink" refers to transmissions that originate at the processing center and end at a video camera.

Features of some embodiments will now be described by reference to FIG. 1 which is a simplified block diagram of portions of a system 100 pursuant to some embodiments. In the simplified block diagram of the system 100, only selected components are depicted in order to illustrate the general configuration of some embodiments. Further details of the selected components and the operation of the system will be provided further below in conjunction with FIGS. 2-4.

As shown in FIG. 1, embodiments of the present invention utilize a system 100 in which one or more video cameras 102 are in wireless communication with one or more video processing centers 120. The video cameras 102 are deployed at an event location 130 and are positioned to allow the capture of video of an event for use in the creation of a cut program for transmission to a production facility. Those skilled in the art will appreciate that the program or data created by the video processing center 120 may be further manipulated, edited, cut or redistributed by a local or remote production facility (not shown). Embodiments described herein are focused on the communication and interaction between the video cameras 102 and one or more broadcasting computers or centers 120, and the operation or configuration of any production or distribution facilities is not described. Pursuant to some embodiments, some or all of the video cameras 102 are in communication with one or more centers 120 via wireless communication links.

As depicted, one or more video cameras 102 are positioned to cover the scene 130 at the event. While two video cameras 102 are shown in FIG. 1, those skilled in the art will appreciate that any number of video cameras 102 may be in communication with one or more video processing centers 120. Any or all of these video cameras 102 may be a combination of steerable and static smart cameras such as video cameras with advanced video analysis capabilities. Pursuant to some embodiments, one or more of the video cameras 102 are capable of processing uncompressed video streams locally at the video camera, and further are capable of extracting SDD. SDD may include any information about the scene 130 that can be extracted based on vision analysis or other sensors capable of measuring data from the scene 130. For example, SDD may include estimates of the video camera's 102 parameters (e.g. camera's orientation and position) or recognition, modeling, and tracking of foreground objects. SDD may also be or include image representations (pixels) of foreground regions, which are referred to as sprites.

Each of the video cameras 102 is in communication with a video broadcasting center 120 via a wireless communication link. In some embodiments, one or more additional video cameras 102 may be in wired communication with the video broadcasting center 120 as well. The video cameras 102 transmit video stream data and SDD to the video broadcasting center 120 over the wireless communication link for use in the production or creation of a broadcast program. The video cameras 102 also receive CCD from the video broadcasting center 120 over the wireless communication link for use in controlling the operation of the camera.

For the purpose of describing features of some embodiments, the wireless communication between the video cameras 102 and the video processing center 120 will be described as using the IEEE Standard 802.11 communications protocol; however, those skilled in the art will appreciate that embodiments may be used with other packet-based wireless protocols or communication networks with equally desirable results. In general, the uplink and downlink transmissions to and from the video cameras 102 and video processing center 120 compete for wireless resources (e.g. radio channel(s), timeslots, etc.) when unlicensed radio systems such as IEEE 802.11 are used. Even data streams sent to and from the same video camera 102 (e.g. video stream and SDD) may compete with each other for these resources. Embodiments utilize radio resource management ("RRM") techniques to resolve this competition for resources. For example, data streams may be allowed to access a radio channel at random, but their access rights may also be influenced by various prioritization/reservation schemes. RRM mechanisms, which are built into wireless protocols, are technology-specific, but their underlying principles are similar.

Pursuant to some embodiments, the resource management of the wireless communications is performed using one or more wireless interface optimizers ("WIOs"—not shown in FIG. 1). As will be described below, these WIOs may be deployed in a number of different ways, including embodiments where the WIO units are deployed with each video camera 102 (described in conjunction with FIG. 2) and embodiments where the WIO units are deployed in a central location (described in conjunction with FIG. 3). According to some embodiments, each WIO unit optimizes the wireless protocol parameters associated with a wireless communication connection or link. The optimization is done based on the several inputs, including the SDD, the CCD, and one or more wireless system parameters (referred to herein as "WSPs-In") that describe the state of the wireless link, such as the signal-to-noise-and-interference ratio ("SNIR") and packet loss rate ("PLR"). The outputs of a WIO unit are wireless system parameters ("WSPs-Out") that control the behavior of the wireless protocols, such as the congestion window ("CW") and modulation and coding scheme ("MCS"). Note that the type and the number of WSPs, as well as the logic inside the WIO depends on the particular wireless technology used (e.g. Wi-Fi, WiMAX, or WiGig). One WIO unit optimizes one wireless interface. Thus, coordination between multiple WIO units may be needed to optimize a wireless network.

As discussed above, in some embodiments, some or all of the video cameras 102 are capable of extracting SDD information from video captured by the camera. The specifics of a method for extracting SDD from an uncompressed video sequence are outside the scope of the instant invention, and are not described in detail herein. Once the SDD information is captured and identified by a camera 102, the SDD are transmitted wirelessly from the video camera 102 to the video processing center 120.

Figure 2:
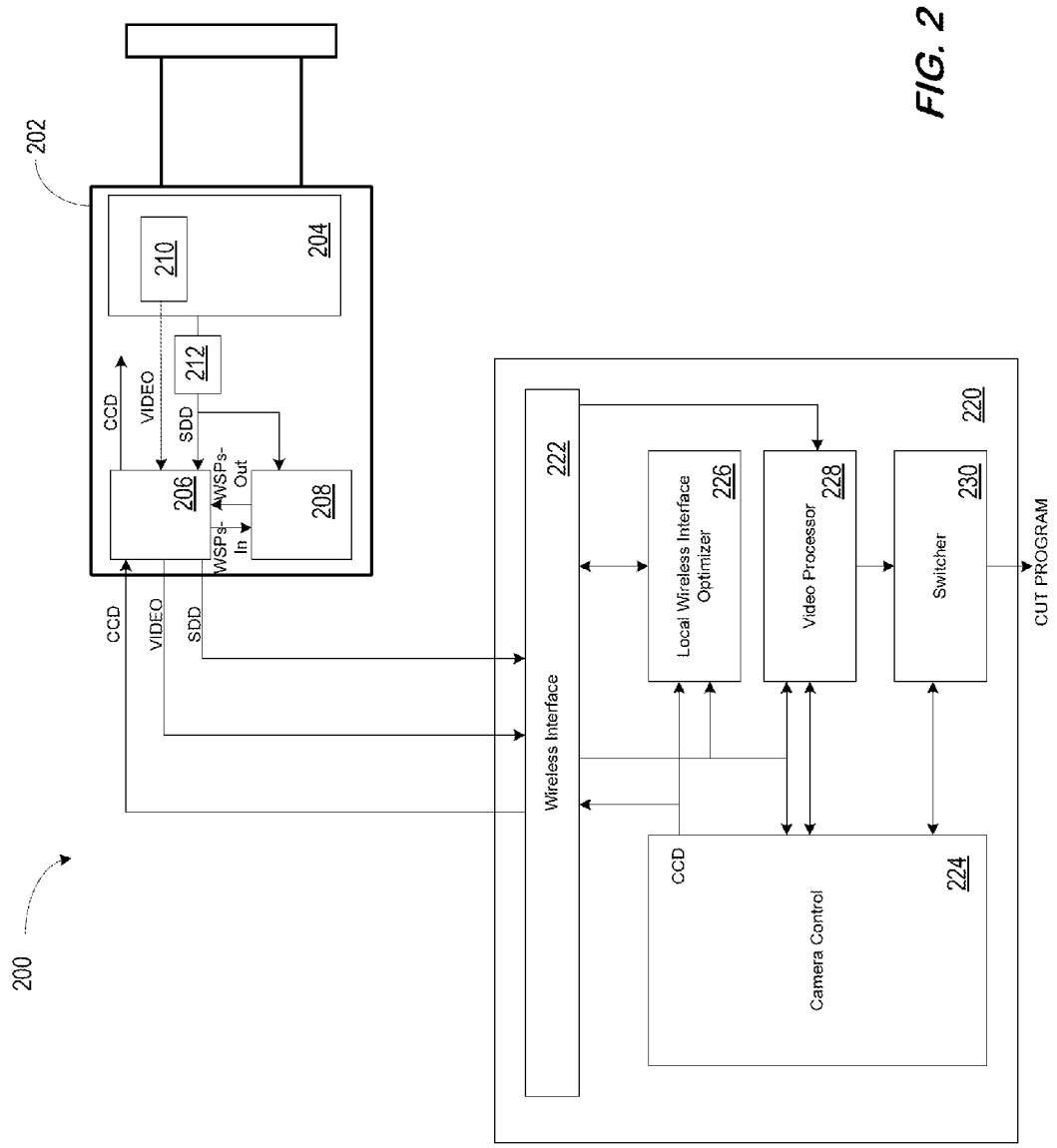
FIG. 2 is a block diagram of portions of a system in accordance with some embodiments of the present invention.
Figure 3:
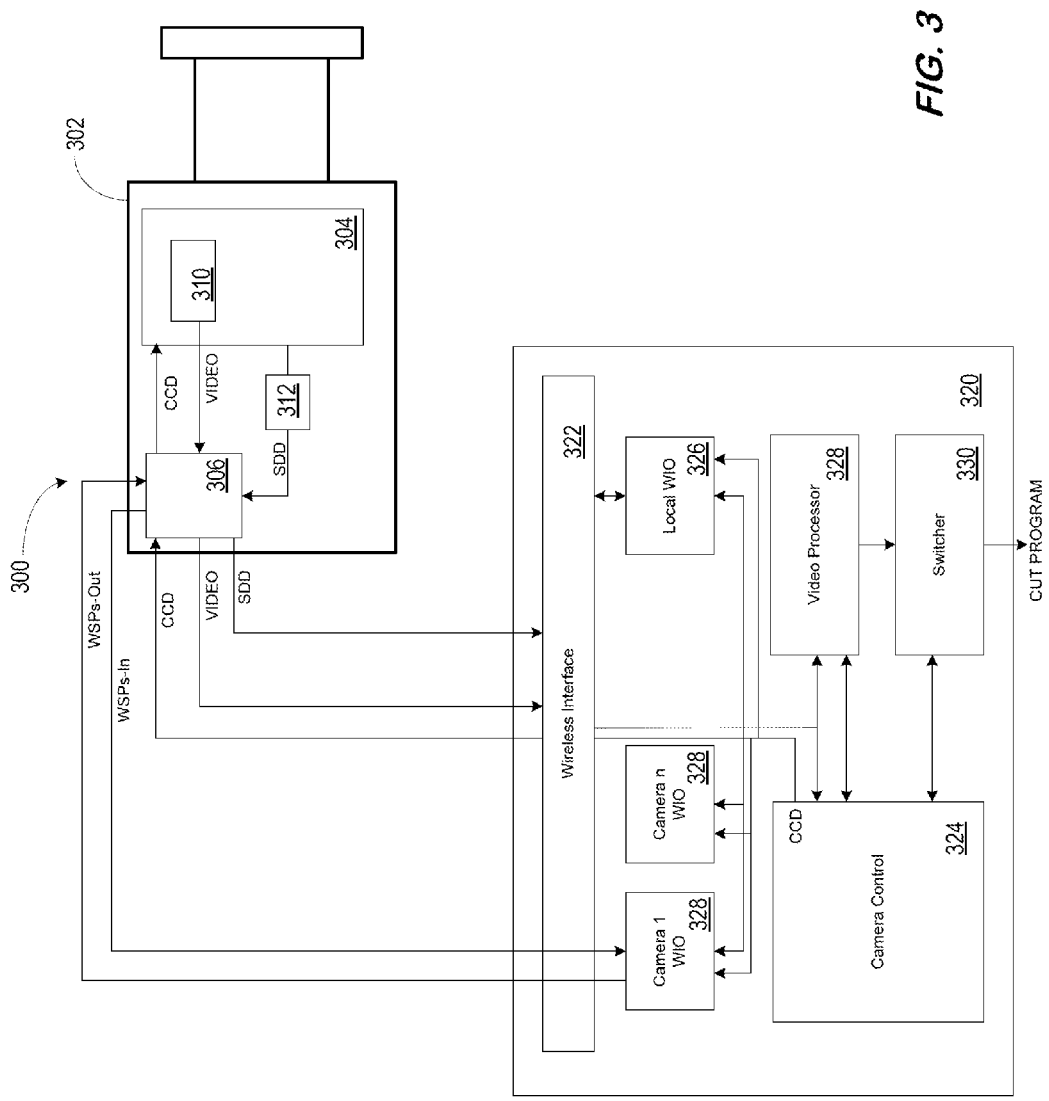
FIG. 3 is a further block diagram of portions of a system in accordance with some embodiments of the present invention.

Pursuant to some embodiments, the SDD extraction is performed by an SDD extractor (items 212 and 312 of FIGS. 2 and 3, respectively). In some embodiments, the SDD extractor is configured as a part of the camera 102, while in other embodiments, the SDD extractor may be external to the camera 102 (e.g., as a module in communication with a camera 102 which is otherwise unable to extract SDD).

As will be explained in detail below, in the case of the centralized embodiment (FIG. 3), WSPs-In data describing the state of the wireless link (such as SNIR and PLR) are also transmitted wirelessly from the video camera 102 to the video processing center 120. Video data is also wirelessly transmitted from the video camera 102 to the video processing center 120. As used herein, the transmission of the SDD and the video data are said to be transmitted "separately" to the extent that the SDD and the video data (and/or other data such as CCD) are transmitted in different streams of packets that may be associated with different treatments (such as different priorities). For example, although both SDD and video data may be transmitted over the same wireless connection between video camera 102 and video processing center 120, the SDD packets may be transmitted using a different priority or treatment (e.g., by setting a marker in the packet headers associated with the SDD packets) than the video data packets.

Pursuant to some embodiments, a number of benefits are obtained by extracting SDD at the video camera 102 (or at a device such as a separate SDD extractor associated a video camera 102) rather than extracting SDD at a remote device or system, such as the video processing center 120. For example, pursuant to some embodiments, SDD packets may be prioritized and transmitted over a wireless communication network with reduced latency as compared to the video data packets (e.g., which are transmitted "separately"). This allows transmission of SDD with reduced latency compared to the transmission of the video packets and allows faster, and more accurate camera control. Further, more accurate and reliable camera control can be obtained, as the SDD is extracted from a lossless video at the video camera 102 instead of extracting the SDD from a lossy (compressed and distorted by packet losses) video at the video processing center 120.

The multiple SDDs associated with each of the different video cameras 102 are analyzed in the processing center 120 and, based on this analysis, video camera 102 control decisions are made, which may include operations such as steering a video camera 102 and initiating handover between different video cameras 102 via the processing center 120. The control decisions are wirelessly conveyed to the video cameras 102 in the form of CCD messages, which may specify the camera priority, orientation, zoom, and other camera-specific settings. The CCDs, together with SDDs and WSPs-In, are passed to the WIOs, where wireless protocol parameters of the different wireless interfaces (where each video camera and the video processing center 220 has its own associated wireless interface optimizer) are jointly optimized. Finally, the CCD that control the video cameras 102 are transmitted back to the video cameras 102 over the wireless communication link. In the case of the centralized embodiment (FIG. 3), the WSPs-Out that control the wireless protocol parameters associated with each camera are also transmitted back to the video cameras 102 over the wireless communication link.

As shown, the system 100 includes a video processing center 120. Although a single center is depicted, in some embodiments, multiple centers or processing stations may be used. The video processing center 120 may be a typical production control station, with video editing, camera controls, and switcher functionalities. Pursuant to some embodiments, the video processing center 120 also has one or more wireless interfaces allowing communication between the center 120 and the video cameras 102. Further, in some embodiments, including the centralized processing embodiment described further below in conjunction with FIG. 3, the video processing center 120 may also have one or more camera wireless interface optimizers ("WIOs", not shown in FIG. 1) allowing the center 120 to optimize wireless protocol parameters pursuant to the present invention. The video processing center 120 receives video data from each of the video cameras, operates on the video data, and generates a cut program that may be transmitted to a broadcast facility for final production and distribution. The video processing center 120 also issues camera control commands for use in controlling the video cameras 102. These camera control commands are transmitted to some or all of the video cameras 102 via wireless communication links.

Further details of some embodiments of the present invention will now be described by reference to FIG. 2 which is a block diagram depicting certain components of a system 200 pursuant to the present invention. In particular, FIG. 2 depicts components of a video camera 202 in communication with a video processing center 220 (where items 202 and 220 may be in wireless communication at an event's site as depicted in FIG. 1). The system 200 of FIG. 2 depicts an embodiment where the video camera 202 has a wireless interface optimizer (WIO) 208 as part of (or distributed with) the video camera 202. Only a single video camera 202 is shown in FIG. 2 for ease of illustration. In a typical broadcast event production environment, multiple video cameras 202 may be deployed, each in communication with the video processing center 220 over wireless networks. Video camera 202 includes a number of components, including the WIO 208, a wireless interface 206, a video capture and processing module 204, and an encoding and compression module 210.

The system 200, as depicted, also illustrates certain components of the video processing center 220. For example, as shown, the system 200 includes a wireless interface 222 for communicating with the one or more video cameras 202 over a wireless communication network. The system 200 also includes components including a camera control module 224, a local wireless interface optimizer 226, a video processor 228 and a switcher 230. Some of the components (including the video processor 228 and switcher 230) may be standard components typically used in the production of broadcast events, and are operated as normal to generate a cut program for transmission to a production studio for broadcast and distribution.

In some embodiments, the video camera 202 may be a high definition video camera, capable of capturing video data and generating high definition video data streams using video capture and processing module 204. Because uncompressed high definition video data streams require extremely high data rates, which cannot be supported with current wireless technologies, these video streams currently need to be compressed/encoded before being transmitted to the video processing center 220. As a result, a compression/encoding module 210 is provided. Video encoding involves high computational complexity and introduces delay, which adds to the radio propagation delay during the transmission of the data from the video camera 202 to the video processing center 220. In existing systems, the encoded video stream is decoded at the video processing center and the video processing center operates on the data to extract the relevant SDD. Applicants have discovered, however, that such processing introduces an undesirable delay when camera control commands and data are to be generated and transmitted back to the video camera. For example, as a result of the delay introduced by video encoding (at the camera), video decoding (at the processing center) and extraction of SDD information (at the processing center), and the transmission of CCD to the video camera, camera control commands may be delayed to the point where tracking of the objects or action in the field, and controlling hand-over between video cameras cannot be performed in a timely manner. As a result, performance and quality suffer in an undesirable manner. Embodiments provide techniques for eliminating or substantially reducing this delay, thereby providing improved performance and quality.

Pursuant to some embodiments, the compression/encoding module 210 performs compression on the video data captured by the video camera 202. The video capture and processing module 204 operates to extract the SDD information from a raw uncompressed video stream at the video camera 202, and wirelessly transmits the SDD information to the processing center. As shown in FIG. 2, the SDD information is fed to a WIO 208 unit and also is transmitted to the video processing center 220 separately from the encoded/compressed video data. Further, the SDD information is transmitted over the wireless network in a dynamically prioritized manner as will be described below. The prioritization, in some embodiments, is performed under control of a WIO 208 associated with each video camera 202. In the embodiment of FIG. 2, the WIO associated with video camera 202 is located at the video camera 202 (in other, centralized systems, the WIO associated with each video camera may be located at a central location, such as at video processing center 220—such embodiments will be described below in conjunction with FIG. 3).

As shown in FIG. 2, each video camera 202 transmits two streams of data over the wireless network to the video broadcasting center 220—an SDD stream (which, as described above, is extracted from the raw video by video capture and processing module 204) and which is transmitted with minimal delay, and an encoded/compressed video stream (encoded and compressed by compression/encoding module 210) and which is transmitted after some encoding delay.

Pursuant to some embodiments, a video camera 202 may transmit the SDD stream only if its associated video feed has been selected by the switcher 230 to be cut into the program. At other times (when the specific video camera 202 has not had its associated video feed selected for use), the video camera 202 may send a reduced-size SDD stream. Similarly, pursuant to some embodiments, a video camera 202 that has not had its associated video feed selected for use may send a reduced-size video stream (e.g., in a lower fidelity), or no video stream at all.

Pursuant to some embodiments, to ensure improved performance and delivery of SDD without delay, the SDD stream is separated from the video stream data and is prioritized for delivery over the wireless network. Such prioritization may be performed in a number of different ways pursuant to the invention. Several illustrative, but not limiting, embodiments will be described hereafter.

In one embodiment, the video stream and the SDD stream may be separated using the IEEE 802.11 quality of service differentiation known as EDCA in the 802.11 standard. In this embodiment, the SDD stream is transmitted from the video camera 202 to the video broadcasting center 220 by either (i) polled contention-free hybrid coordination function ("HCF") controlled channel access ("HCCA"), or (ii) higher priority medium access using access categories that lead to lower delays, smaller average number of potential retransmissions, and hence higher reliability. The 802.11 standard uses a medium access control protocol in which a contention window is used to randomize the time at which a transmitter (such as the wireless interface 206 of the video camera 202) initiates a frame exchange. The earlier the transmitter attempts the frame exchange, the higher the priority. Using prioritization mechanisms defined in the 802.11 standard, the contention window start time and size can be modified such that different transmitters enjoy different throughputs, and thereby different priorities. The prioritization can be realized between stations (e.g., to prioritize different wireless interfaces 206 of different video cameras 202 at an event), or within a single station (e.g., to prioritize the transmission of SDD streams over video streams from a particular video camera 202). Pursuant to some embodiments, the prioritization of transmission of SDD streams over the transmission of video streams, as well as the prioritization of transmission of other streams in systems of the present invention may be controlled using these techniques.

Other techniques may also be used pursuant to some embodiments. For example, cognitive radio mechanisms may be applied to the two separate camera streams (including the SDD stream and the video data stream), by transmitting the data in different spectra. For example, in one embodiment, the TV white space spectrum may be used to transmit the large amount of data comprising the encoded video stream, and the 60 GHz low latency spectrum for the SDD stream. Other spectra may also be used to control and prioritize the delivery of the different data streams between and among the video cameras 202 and video broadcasting center 220 of the present invention.

In still another illustrative embodiment, the two separate data streams (video data and SDD), or part of each, could be sent at different licensed frequencies such as channels in the BAS 2.5 GHz range. For example, one or multiple channels in the licensed BAS 2.5 GHz range might not be used by the intended broadcast service at a given location and hence may be available for sending the SDD at highest reliability, and some of the video streams would be sent in other spectrum that are less reliable.

As shown in FIG. 2 (as well as in FIG. 3, below), each video camera 202 also receives CCD from the video broadcasting center 220. The CCD is used to control each video camera 202, including the camera orientation, camera priority, zoom, and other camera specific settings. CCD may also be sent via the wireless network in the downlink to control, for example, the camera's view and the encoder's parameters. The video camera 202 receives CCD streams and implements the commands accordingly. Both uplink and downlink communications of SDD and CCD streams, respectively, need to be transmitted at high priority to ensure desirable operations and performance. As a result, pursuant to some embodiments, to guarantee a high priority transmission, embodiments utilize CCD to adapt WIO operation (similar to the use of the SDD described above in the uplink communication). Priority mechanisms similar to what was discussed for SDD uplink prioritization above can be applied. In general, applicants have found that in some situations, individual camera CCD streams should be prioritized over other camera CCD streams (based on relative camera priorities) and over the uplink's streams. Embodiments of the present invention allow such dynamic prioritization between streams, between data sets, and between cameras.

Further, in some embodiments, in addition to dynamically prioritizing SDD and CCD streams, features of the present invention can be used to prioritize individual video streams from one video camera over other video cameras when needed. Or to prioritize different layers of the same video stream utilizing layered and scalable video coding methods (e.g. where encoded data is structured into layers, different priority may be given to different layers of the same video stream). This can be particularly helpful when unlicensed radio systems are used and radio spectrum is shared in uplink and where transmitters transmit at the same channel. Further, such dynamic prioritization may also be applied for a system where the video cameras 202 and the production switcher 230 are operated by cameramen and a director, respectively. In this case, based on the switcher 230 state, the video streams may be prioritized to alleviate traffic load on the wireless network.

Reference is now made to FIG. 3 which is a block diagram depicting certain components of a system 300 pursuant to the present invention. In particular, FIG. 3 depicts components of a video camera 302 which are substantially similar to the video camera 202 of FIG. 2, except that the video camera 302 does not include a wireless interface optimizer ("WIO"). Instead, the functions performed by the wireless interface optimizer to optimize the transmission of signals between video camera 302 and video broadcasting center 320 are performed by a WIO 328 located at the video broadcasting center 320. That is, the system 300 of FIG. 3 uses a centralized architecture for the wireless interface optimization of components within the system.

As with the system of FIG. 2, the system of FIG. 3 includes one or more video cameras 302 positioned to cover a scene at an event. These video cameras 302 may be a combination of steerable and static smart cameras. Uncompressed video streams are processed locally at each video camera 306 and SDD are extracted. The SDD is transmitted wirelessly from the camera system to the video processing center 320, along with the video stream and WSPs-In that describes the state of the wireless communication link, such as SNIR and PLR. The multiple SDDs respective to the different video cameras 302 are analyzed in the video processing center 320 and, based on this analysis, camera control decisions are made, which may include operations such as steering the video cameras 302 and initiating handover via a switcher 330 at the video processing center 320. The control decisions are conveyed to the video cameras 302 in the form of CCD messages, which may specify the camera priority, orientation, zoom, and other camera-specific settings. The CCD, together with SDDs and WSPs-In, are passed to the WIOs, where wireless protocol parameters of the different wireless interfaces (camera n wireless interface units and the processing center wireless interface unit) are jointly optimized. Finally, the CCD and the WSPs-Out that control the video cameras 302 and the behavior of the wireless protocols, respectively, are transmitted back to the video cameras 302.

Applicants have discovered that optimization of the wireless network and transmissions is simplified in the case of the centralized solution of FIG. 3 as compared to the distributed system of FIG. 2; however, the system of FIG. 3 may present signaling overhead as the WSP information needs to be sent and received to and from the video cameras 302. Placing wireless interface optimization units at the video cameras makes the overall wireless network optimization more difficult, but reduces or eliminates this signaling overhead.

Figure 4:
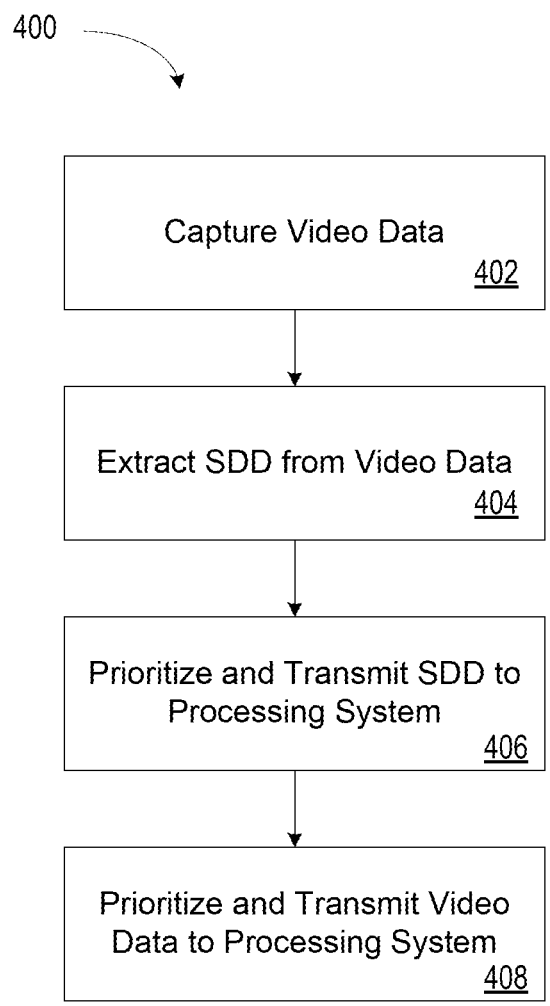
FIG. 4 is a flow diagram of a process in accordance with some embodiments of the present invention.

Reference is now made to FIG. 4 which illustrates a method that might be performed, for example, by some or all of the elements described herein (such as the elements described in conjunction with FIGS. 1-3). The flow chart described herein does not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 402, video data (and in some embodiments, audio data) from an event (such as a live event to be broadcast) is captured. The video data may be captured from devices such as the video camera 102 positioned and operated at the event (such as in the system described in FIGS. 1-3 above). As used herein, the phrase "video data" may refer to any signal conveying information about a moving image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type of video feed, including a standard broadcast feed and/or a 3D image feed. Those skilled in the art will appreciate that during each of the processes of FIG. 4, CCD streams may be sent or received by the video camera 102 to change its orientation or operation or to inform the video broadcasting center 120 of changes in operation.

Processing at 404 includes extracting the SDD information from the video data captured at 402. In some embodiments, the SDD information is extracted during the video capture process by use of a video capture and processing module associated with the video camera 102. The extraction of the SDD information may be performed in a number of ways, using techniques known to those skilled in the art.

Processing at 406 includes prioritizing and transmitting the SDD information to the video processing system 120. In some embodiments, processing at 408 includes prioritization of the video with respect to the videos transmitted by other cameras. For example, based on information within the extracted SDD or received CCD, a certain camera feed may be covering (or may be steered to follow) an activity of interest, hence this camera's video may be set at a high priority while the other cameras' video may be set into low priority to alleviate the traffic load on the network.

Pursuant to some embodiments, the video stream transmitted from a video camera 102 may be encoded at an adaptive bit rate that is a function of the current wireless network capacity (based on information conveyed by WSPs from the wireless interface optimizer 208 to the wireless interface 206). In such a case, this bit rate would be higher when the video is currently cut into the program (based on information conveyed in the CCD stream). In some embodiments, processing at 408 includes prioritization of the video's different layers. For example, when using layered and scalable coding methods, where encoded data is structured into layers, different priority may be given to different layers of the same video stream. Typically, first layer will encode low resolution representation of the video while successive layers will each add more details to the video stream. Hence, depending on information received in the SDD and CCD streams and the current network condition, different priorities may be assigned dynamically to different video layers.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

In some embodiments, multiple wireless interfaces may be supported. For example, multiple wireless interfaces could be provided at each camera and at the video processing center, using different wireless technologies. As a specific illustrative, but not limiting, example, one interface could support IEEE 802.11, while a second interface could support communication via IEEE 802.16. As a further illustrative, but not limiting, example, the multiple wireless interfaces may each support a different frequency band (e.g., one could be at 2.4

GHz, and another at 60 GHz). In some embodiments, part of the system optimization could be to select the most appropriate interface based on SDD, CCD and WSPs. Further, one interface could be used for high-priority data (SDD and CCD) and another wireless interface could be used for the video data.

Moreover, although specific hardware and data configurations have been described herein, note that any number of other configurations may be provided in accordance with embodiments of the present invention (e.g., some of the information associated with the databases and engines described herein may be split, combined, and/or handled by external systems). Further note that embodiments may be associated with any number of different types of broadcast programs or events (e.g., sports, news, and weather programs).

Those skilled in the art, upon reading this disclosure, will appreciate that FIGS. 1-3 are conceptual block diagrams intended to illustrate certain features of embodiments (such as the communication between different components), and that certain functions and components described in FIGS. 1-3 may be implemented using a variety of devices or combinations of devices. For example, some of the functions shown as separate blocks may be implemented using a single component or set of components.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   capturing, by a video camera, video data at an event site;
   extracting scene description data ("SDD") from the video data prior to transmission to a video processing system;
   transmitting, over a wireless communication network, the SDD to the video processing system, the SDD transmitted in a plurality of SDD packets; and
   transmitting, over the wireless communication network, the video data to the video processing system, the video data transmitted in a plurality of video data packets, wherein the plurality of SDD packets and the plurality of video data packets are prioritized to have a different transmission priority based on information in at least one of the SDD packets, the information comprising at least one of: recognition of objects at the event site, tracking of objects at the event site, modeling of objects at the event site, image representations of regions of the event site, position of the video camera, orientation of the video camera, and video camera parameters.

2. The method of claim 1, further comprising:
   receiving, by the video camera, camera control data ("CCD") over the wireless communications network, the CCD transmitted in a plurality of CCD packets prioritized to have a different transmission priority based on the information in at least one of the SDD packets.

3. The method of claim 1, further comprising:
   controlling the wireless communication network to establish a priority of the transmission of the plurality of SDD and video data packets.

4. The method of claim 3, wherein the controlling the wireless communication network is performed under control of a wireless interface optimizer.

5. The method of claim 4, wherein the wireless interface optimizer is located at the video camera.

6. The method of claim 4, wherein the wireless interface optimizer is located at the video processing system.

7. The method of claim 3, wherein controlling the wireless communication network further comprises:
   controlling the wireless communication network to establish a priority of the transmission of the video data.

8. The method of claim 7, wherein the priority of the transmission of the video data is controlled based at least in part on at least one of the SDD and CCD associated with the video camera.

9. The method of claim 1, further comprising at least a second video camera to capture second video data at the event site, the method further comprising:
   controlling the wireless communication network to establish a relative priority of data packets containing the video data and the second video data.

10. The method of claim 9, further comprising:
    extracting a second set of SDD from the second video data;
    transmitting, over the wireless communication network, the second set of SDD to the video processing system, the second set of SDD transmitted in a second plurality of SDD packets; and
    transmitting, over the wireless communication network, the second video data to the video processing system, the second video data transmitted separately from the second plurality of SDD packets.

11. The method of claim 10, wherein the second video data and the second plurality of SDD packets are transmitted with different priorities, where the priorities are established based on the information in the SDD and the second set of SDD.

12. The method of claim 10, further comprising:
    receiving, by the second video camera, second CCD over the wireless communications network, the second CCD transmitted in a plurality of CCD packets having a different transmission priority than at least one of the SDD and the video data packets.

13. The method of claim 12, wherein a relative priority of transmission is established based on at least one of (i) the information in the SDD and the second set of SDD, and (ii) information in the CCD and the second CCD.

14. The method of claim 1, further comprising:
    compressing the video data prior to transmitting the video data to the video processing system.

15. A video camera, for capturing event video data at an event site, comprising:
    a video capture and processing subsystem for processing the captured event video data and extracting scene description data ("SDD") from the event video data;
    a compression subsystem for compressing the event video data; and
    a wireless interface receiving at least a first wireless system parameter to control a transmission priority of the wireless interface, the wireless interface operable to wirelessly transmit the compressed event video data in a first transmission priority, and to wirelessly transmit the SDD in a second transmission priority, wherein the first transmission priority and the second transmission priority are based on information in the SDD, the information comprising at least one of: recognition of objects at the event site, tracking of objects at the event site, modeling of objects at the event site, image representations of regions of the event site, position of the video camera, orientation of the video camera, and video camera parameters.

16. The video camera of claim 15, wherein the wireless interface further receives CCD from a video processing system, the CCD transmitted in a plurality of data packets prioritized in a third transmission priority.

17. The video camera of claim 16, further comprising:
a wireless interface optimizer, the wireless interface optimizer generating the at least first wireless system parameter based on at least one of the SDD and the CCD.

18. The video camera of claim 15, wherein the at least first wireless system parameter is received over the wireless interface from a video processing system.

19. A non-transitory, computer-readable medium storing program code executable by a computer to perform a method, said method comprising:
capturing video data at an event site by a video camera;
extracting scene description data ("SDD") from the video data prior to transmission to a video processing system;
transmitting, over a wireless communication network, the SDD to the video processing system, the SDD transmitted in a plurality of SDD packets; and
transmitting, over the wireless communication network, the video data to the video processing system, the video data transmitted in a plurality of video data packets separately from the SDD packets, wherein the plurality of SDD packets and the plurality of video data packets are prioritized to have a different transmission priority based on information in at least one of the SDD packets, the information comprising at least one of: recognition of objects at the event site, tracking of objects at the event site, modeling of objects at the event site, image representations of regions of the event site, position of the video camera, orientation of the video camera, and video camera parameters.

20. The non-transitory, computer-readable medium storing program code executable by a computer to perform a method of claim 19, said method further comprising:
receiving camera control data ("CCD") over the wireless communications network, the CCD transmitted in a plurality of data packets prioritized separately from said plurality of video data packets and said SDD packets.

* * * * *